(12) United States Patent  
Ryu

(10) Patent No.: US 6,226,047 B1
(45) Date of Patent: May 1, 2001

(54) METHOD AND APPARATUS FOR PROVIDING AN IMPROVED USER INTERFACE IN A SETTOP BOX

(75) Inventor: Choong-IL Ryu, Seoul (KR)

(73) Assignee: Daewoo Electronics Co., Ltd., Seoul (KR)

( * ) Notice: Subject to any disclaimer, the term of this patent is extended or adjusted under 35 U.S.C. 154(b) by 0 days.

(21) Appl. No.: 09/074,071

(22) Filed: May 6, 1998

(30) Foreign Application Priority Data

May 30, 1997 (KR) .................................................. 97-22205
May 30, 1997 (KR) .................................................. 97-22206

(51) Int. Cl.[7] ............................... H04N 5/50; H04N 7/94
(52) U.S. Cl. ........................ 348/569; 348/589; 348/600; 345/116
(58) Field of Search ...................... 348/578, 586, 348/584, 588, 589, 598, 600, 569, 700, 563, 564, 565; 345/114, 115, 116, 113; H04N 5/50, 9/74

(56) References Cited

U.S. PATENT DOCUMENTS

| 5,357,286 | * | 10/1994 | Hwang | 348/589 |
| 5,406,306 | * | 4/1995 | Siann et al. | 345/115 |
| 5,821,918 | * | 10/1998 | Reinert et al. | 345/154 |
| 5,978,046 | * | 11/1999 | Shintani | 348/589 |
| 6,057,888 | * | 5/2000 | Bril | 348/569 |
| 6,097,442 | * | 8/2000 | Rumreich et al. | 348/589 |

FOREIGN PATENT DOCUMENTS 9430008    12/1994  (WO) .
9814003     4/1998  (WO) .

\* cited by examiner

*Primary Examiner*—Michael Lee
(74) *Attorney, Agent, or Firm*—Anderson Kill & Olick, PC

(57) ABSTRACT

A method and apparatus provide multiple on-screen displays in a signal processing unit capable of processing terrestrial, cable, and satellite broadcast signals. Also, a method and apparatus, for use in a settop box(STB), can provide quality OSD's(On-Screen Displays) to be displayed together with analog broadcast signals. The OSD's are processed at a digital signal processing module in the STB. While the analog broadcast signal is being displayed on the screen, the viewer can use an improved GUI processed by the digital signal processing module. The digital signal processing module includes a digital broadcast signal demodulator, a first and a second detectors, an A/D convertor, a microprocessor, an OSD buffer, an OSD generator, a video decoder, a mixing circuit, an NTSC/PAL encoder, switches, a first and a second AND gate, an inverter, and an OR gate.

19 Claims, 4 Drawing Sheets

METHOD AND APPARATUS FOR PROVIDING AN IMPROVED USER INTERFACE IN A SETTOP BOX

FIELD OF THE INVENTION

The present invention relates to an on-screen display method and apparatus therefor; and, more particularly, to a method and apparatus for providing multiple on-screen displays in a signal processing unit capable of processing terrestrial, cable and satellite broadcast signals.

DESCRIPTION OF THE PRIOR ART

Conventional television receivers (TV's) are equipped with a graphic user interface(GUI) in the form of an on-screen display(OSD) for displaying OSD data on a screen of a picture reproduction device either in place of a picture represented by video signals or together with the picture. The OSD data can take the form of alphanumeric symbols, pictorial graphics, or both; and can be channel numbers, channel information, teletexts, operating instructions, or the like. However, the conventional TV can process only analog signals such as terrestrial and cable broadcast signals which carry a limited amount of OSD data insertable in a vertical blanking interval thereof, thereby providing a simple OSD of, e.g., a limited color resolution.

Recently, a new broadcasting system, utilizing a communication satellite and digitized broadcast signals, has been rapidly gaining popularity worldwide. The satellite broadcasting system, which can provide broadcast signals to a wide area, employs superhigh RF(radio frequency) signals ranging, e.g., from 11.7 GHz to 12.2 GHz, for carrying the digitized broadcast signals. To receive the superhigh RF signals, a satellite broadcast signal receiver is normally equipped with a low noise blockdown converter for converting the superhigh RF signals into RF signals of, e.g., 950 to 2050 MHz. Thereafter, a tuner employed in the satellite broadcast signal receiver is tuned to a channel selected by a user using the converted RF signals.

Owing to the superhigh carrier frequencies, a channel bandwidth of the satellite broadcast signals can be wider than that for the terrestrial and cable broadcast signals, enabling a greater amount of OSD data to be carried in the satellite broadcast signals and resulting in an advanced OSD capability of the satellite broadcasting system.

In order to process all of such broadcast signals as terrestrial, cable and satellite broadcast signals at a single unit, a composite receiver, i.e., the so-called settop box (STB), has been developed. Referring to FIG. 1, there is shown a signal processing unit 50 for use in a prior art STB, comprising a tuner 100, an analog signal processing module 10, a digital signal processing module 20, a switch 117, a microprocessor 105, a RAM 106, and a key matrix 107. The analog signal processing module 10 includes an analog broadcast signal demodulator 101, a first detector 103, a composite video signal processing circuit 108, an OSD generator 109, and a mixing circuit 110, whereas the digital signal processing module 20 includes a digital broadcast signal demodulator 102, a second detector 104, an OSD buffer 111, an OSD generator 112, an MPEG block 115 which has therein a video decoder 113 and a mixing circuit 114, and an NTSC/PAL encoder 116.

The key matrix 107 provides the microprocessor 105 with input signals via a line L18 for executing certain functions by key inputs of a viewer. The key matrix 107 has, e.g., a mode key for generating a mode selection signal for selecting either an analog mode corresponding to the terrestrial and cable broadcast signals or a digital mode corresponding to the satellite broadcast signal; a channel up/down key and numerical keys for generating a channel selection signal for selecting a desired broadcast channel; and an OSD key for generating an OSD request signal for requesting the OSD data, e.g., carried by the selected channel to be displayed on a screen(not shown). Typically, a remote controller(not shown) can be used instead of the key matrix 107.

In response to the mode and the channel selection signals from the key matrix 107, the microprocessor 105 generates a tuning control signal representing a mode and a channel to be tuned to the tuner 100 via a line L16 and also provides the switch 117 with a control signal CS1 for selecting a video signal on a terminal "0" or "1" thereof.

The tuner 100 tunes a selected channel of the terrestrial, the cable, or the satellite broadcast signals in response to the tuning control signal fed from the microprocessor 105 and outputs the tuned channel signal to the analog broadcast signal demodulator 101 or the digital broadcast signal demodulator 102 depending on whether the selected channel corresponds to either the terrestrial and the cable broadcast signals or the satellite broadcast signal.

When a terrestrial or a cable channel is selected by a viewer through the key matrix 107, the selected channel is tuned by the tuner 100 and the switch 117 is connected to a terminal "0" in response to the control signal CS1 issued by the microprocessor 105. The tuned channel signal is fed to the analog broadcast signal demodulator 101. The analog broadcast signal demodulator 101 demodulates the tuned channel signal to generate a baseband composite video signal to the first detector 103 and the composite video signal processing circuit 108 via a line L11.

The composite video signal includes a synchronization signal, an analog video signal and OSD data carried via a vertical blanking interval thereof. Then, the composite video signal processing circuit 108 processes the composite video signal by performing, e.g., a level amplification, noise elimination, gain control, etc, to thereby provide a video image signal representing, e.g., a video image 303 shown in FIG. 3A to be displayed on the screen. The first detector 103 extracts the OSD data included in the baseband composite video signal and provides the extracted OSD data signal to the OSD generator 109 via a line L19.

When the viewer instructs to generate an OSD on the screen in order to control the STB or to view information, e.g, teletext, channel information, or the like, carried by the selected channel, an OSD generation signal fed from the microprocessor 105 via a line L12 is inputted to the OSD generator 109, wherein the OSD generation signal is generated in response to the OSD request signal or the channel selection signal fed thereto from the key matrix 107 via the line L18. Responding to the OSD generation signal, the OSD generator 109 creates, e.g., an OSD 301 shown in FIG. 3B corresponding to the OSD data signal fed thereto from the first detector 103. The OSD data signal includes OSD data to be displayed on the screen 302 and position information thereof within the screen 302; and can be, e.g., a newly selected channel number generated on a line L13 from the microprocessor 105 in case the OSD generation signal is generated by the channel selection signal. Thereafter, the OSD generator 109 transmits the OSD signal representing the OSD 301 to the mixing circuit 110, wherein the OSD signal includes a video signal corresponding to the OSD 301 and position information thereof within the screen 302.

The mixing circuit 110 mixes the video image signal provided from the composite video signal processing circuit 108 with the OSD signal generated by the OSD generator 109 with reference to the synchronization signal included in the video image signal, to thereby produce a composite video image signal representing a composite video image 304 shown in FIG. 3C, wherein the composite video image 304 includes the OSD 301 and a portion of the video image 303 non-overlapping therewith. The composite video image signal is transmitted, as a video output signal of the signal processing unit 50, through the terminal "0" of the switch 117 to a display unit(not shown) for the display thereof.

When the viewer selects a satellite channel, the selected satellite channel is tuned by the tuner 100 and the switch 117 is connected to a terminal "1" in response to the control signal CS1 issued by the microprocessor 105. The selected satellite channel signal is demodulated at the digital broadcast signal demodulator 102 to thereby generate a satellite video signal to be fed to the video decoder 113, wherein the satellite video signal is an encoded digital signal, compressed based on, e.g., the so-called MPEG(Moving Picture Expert Group)-2 scheme and includes an encoded digital video signal and digitized OSD data. The video decoder 113 decodes the encoded digital video signal to thereby provide the mixing circuit 114 with a reconstructed digital video signal corresponding to, e.g., a reconstructed video image 405 shown in FIG. 4A. Meantime, the second detector 104 extracts the digitized OSD data from the satellite video signal and provides same on a line L15 to the microprocessor 105 which in turn stores the extracted OSD data in the RAM 106 via a line L17.

When the viewer requests to generate an OSD on the screen by generating the OSD request signal via the key matrix 107 in order to control STB or to view information, e.g., teletext, channel information, or the like, carried by the selected satellite channel, the microprocessor 105 retrieves the OSD data signal from the RAM 106 via the line L17 and provides the retrieved OSD data signal to the OSD generator 112 via the line L13. Also, as in the case of the analog signal processing module 10, the OSD data signal can be, e.g., a channel number or volume level generated by the microprocessor 105, if a channel or volume level is changed by the viewer. The OSD data signal includes OSD data to be displayed and position information thereof within the screen. Responding to the OSD data signal, the OSD generator 112 creates, e.g., a combined OSD 401 shown in FIG. 4B, wherein the combined OSD 401 includes one or more actual OSD's 402 and 403 and a surplus OSD 404. The created OSD signal representative of the corresponding combined OSD 401 and position information thereof within the screen are temporarily stored at the OSD buffer 111, and then transmitted to the mixing circuit 114, wherein each pixel included in the OSD signal is represented by luminance (Y) data and chrominance ($C_r$, $C_b$) data as well known in the art. For instance, each pixel of the OSD signal includes Y of 6-bits, $C_r$ of 4-bits and $C_b$ of 4-bits.

Among the OSD's included in the combined OSD 401, only the actual OSD's 402 and 403 carry OSD data to be displayed on the screen, while the surplus OSD 404 has dummy data not to be displayed on the screen. A combined OSD is of a rectangular shape and is constructed such that the combined OSD includes therein all the actual OSD's to be displayed on the screen simultaneously and a surplus OSD corresponding to the remaining portion of the combined OSD not occupied by the actual OSD's. Such an OSD structure is advantageous in storing and retrieving OSD data in and from a storage, e.g., OSD buffer 111, especially when there exists a plurality of actual OSD's to be displayed on the screen at the same time and those OSD's overlap horizontally, or in other words, share one or more horizontal scanning lines, as shown in FIG. 4B.

Next, the mixing circuit 114 generates a digital video image signal by mixing the reconstructed video signal from the video decoder 113 and the OSD signal from the OSD buffer 111. For example, as shown in FIG. 4C, the digital video image signal is constructed by the actual OSD's 402 and 403 replacing a portion of the reconstructed video signal overlapping therewith and the remaining portion of the reconstructed video signal non-overlapping with the actual OSD's 402 and 403.

In the NTSC/PAL encoder 116, the digital video image signal is converted to a standard NTSC/PAL analog signal based on, e.g., a 27 MHz synchronization(SYNC) signal applied thereto from an internal oscillator(not shown) and outputted as the video output signal via the terminal "1" of the switch 117.

As described above, analog and digital OSD's are processed at their respective signal processing modules in a conventional STB, which may deteriorate the quality of the analog OSD's; and further there exist redundancies of the OSD generators and the mixing circuits in the signal processing modules of the STB.

SUMMARY OF THE INVENTION

It is, therefore, an object of the present invention to provide a method and apparatus, for use in a settop box (STB), capable of providing quality OSD's(On-Screen Displays) to be displayed together with analog broadcast signals, wherein the OSD's are processed at a digital signal processing module in the STB.

In accordance with one aspect of the invention, there is provided a method, for use in a video equipment, for providing a mixed video image signal, wherein the video equipment has a tuner for selecting an analog or a digital broadcast signal, comprising the steps of:

a) generating an analog video signal from the selected analog broadcast signal;

b) providing a digital on-screen display(OSD) signal including a combined OSD signal representing a combined OSD, wherein the combined OSD signal has therein an actual OSD signal representing one or more OSD's to be displayed on a screen;

c) producing a digital padding signal;

d) replacing a portion of the digital padding signal with the actual OSD signal to thereby provide a mixed digital OSD signal;

e) converting the mixed digital OSD signal into an analog OSD signal; and f) substituting a part of the analog video signal with a fraction of the analog OSD signal corresponding to the actual OSD signal to thereby provide the mixed video image signal.

In accordance with another aspect of the invention, there is provided an apparatus for providing a mixed video image signal, comprising: a tuner for selecting an analog or a digital broadcast signal; a digital padding signal generator; a composite video signal processing circuit for generating an analog video signal from the selected analog broadcast signal; a video decoder for providing a reconstructed digital video signal from the selected digital broadcast signal; an MPEG block for producing, as a digital image signal, the digital padding signal or the reconstructed digital video signal if the analog or the digital broadcast signal is selected; an OSD generator for obtaining a digital OSD signal including a combined OSD signal, wherein the combined OSD signal has therein an actual OSD signal representing one or more OSD's to be displayed on a screen; a mixing circuit for replacing a portion of the digital image signal with the actual OSD signal to thereby provide a mixed digital image signal; an NTSC/PAL encoder for converting the mixed digital image signal into a mixed analog image signal; a transparency indicator for generating a first control signal if the digital broadcast signal is selected, and if the analog broadcast signal is selected, determining whether each pixel included in the mixed digital image signal belongs to the actual OSD signal to thereby generate the first control signal if each pixel belongs to the actual OSD signal and a second control signal if otherwise; and a switch for selecting, on a pixel-by-pixel basis, the mixed analog image signal and the analog video signal in response to the first and the second control signals, respectively, to thereby provide the mixed video image signal.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
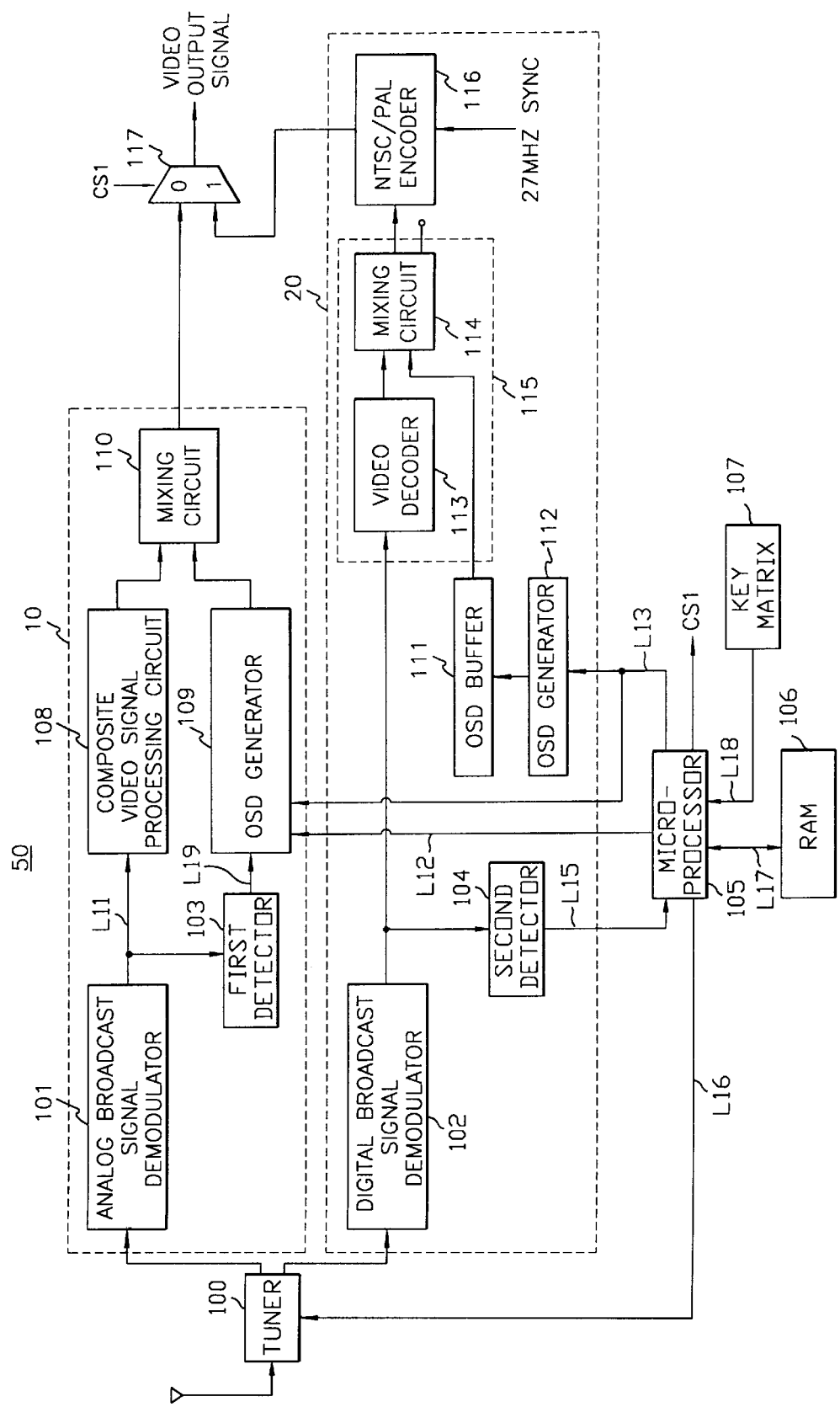
FIG. 1 shows a conventional signal processing unit for use in a STB.
Figure 2:
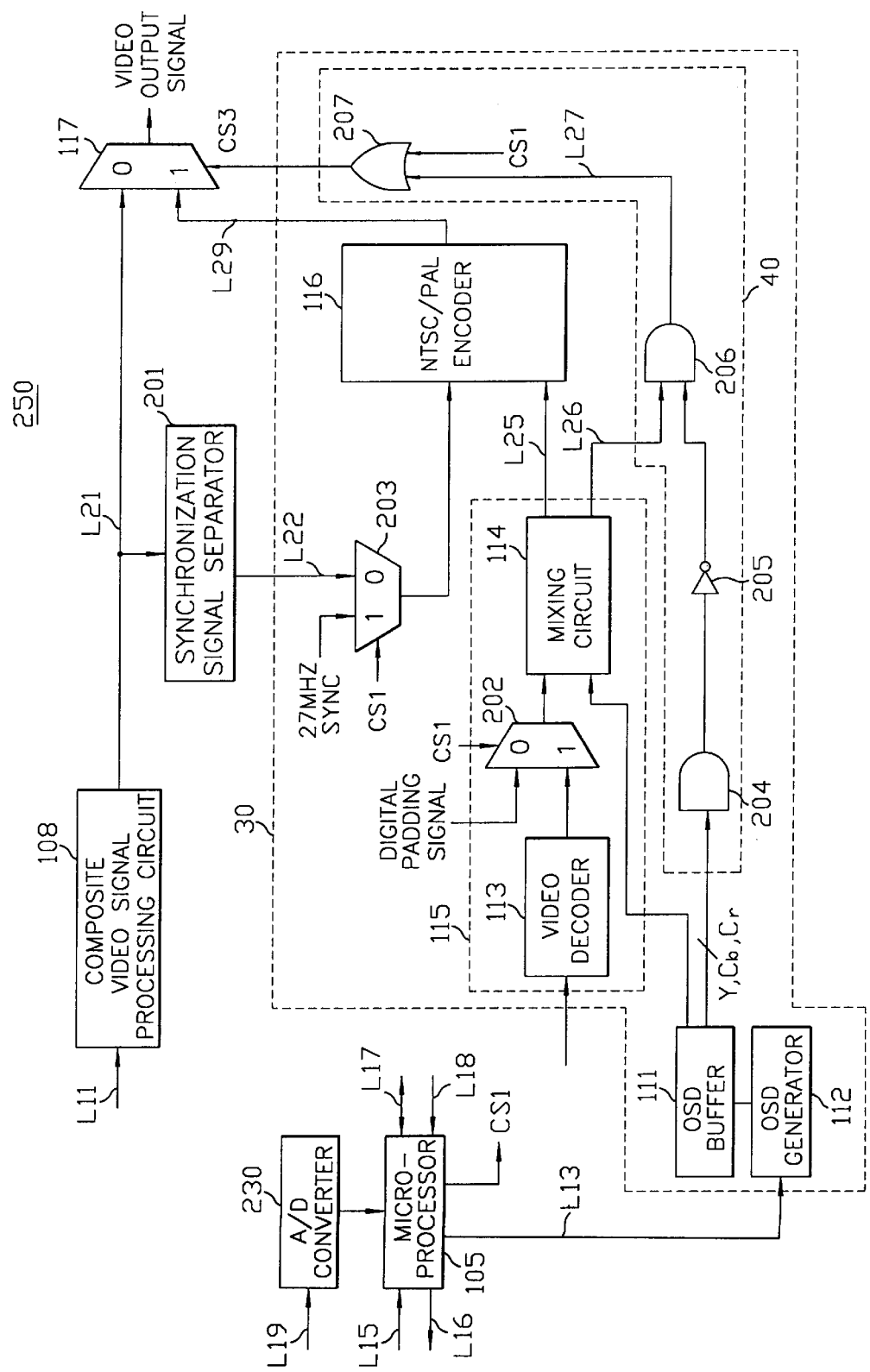
FIG. 2 represents a signal processing unit for use in a STB in accordance with the present invention.

Referring now to FIG. 2, there is shown a signal processing unit 250 for use in a STB in accordance with the present invention. For the sake of simplicity, like elements are represented by like reference numerals in FIGS. 1 and 2; and the tuner 100, the analog broadcast signal demodulator 101, the digital broadcast signal demodulator 102, the second detector 104, and the key matrix 107 shown in FIG. 1, are omitted in FIG. 2 since those elements function in identical manners as described in FIG. 1.

The signal processing unit 250 includes those omitted elements 100, 101, 102, 104 and 107 and further includes a composite video signal processing circuit 108, a synchronization signal separator 201, a switch 117, a digital signal processing module 30, an A/D converter 230, and a microprocessor 105.

The digital signal processing module 30 includes an OSD buffer 111, an OSD generator 112, a video decoder 113, a mixing circuit 114, and an NTSC/PAL encoder 116 as in FIG. 1 and further includes switches 202 and 203, a first and a second AND gate 204 and 206, an inverter 205, and an OR gate 207. The first and second AND gates 204 and 206, the inverter 205, and the OR gate 207 form a transparency indicator 40 which will be described later in more detail and the video decoder 113, the switch 202 and the mixing circuit 114 constitute an MPEG block 115. Comparing with the prior art signal processing unit 50 shown in FIG. 1, only one OSD generator 112 and one mixing circuit 114 exist in the signal processing unit 250 of the present invention, and the first detector 103 is coupled to the A/D convertor 230 via the line L19 instead of the OSD generator 109.

First, when a terrestrial or a cable channel is selected by a viewer, the switches 202 and 203 are connected terminals "0" thereof in response to a control signal CS1 issued by the microprocessor 105 and also the switch 117 is connected terminal "0" thereof in response to a control signal CS3 issued by the transparency indicator 40, and a composite video signal is inputted to the composite video signal processing circuit 108 via a line L11 as in FIG. 1. In the preferred embodiment of the invention, the control signal CS1 is of a first logic level, e.g., 0, when an analog channel, i.e., a terrestrial or a cable channel, is selected. An output control signal CS3 of the OR gate 207 is set as "0" if no OSD is generated while an analog channel is selected, as will be described in detail hereinafter.

Figure 4A:
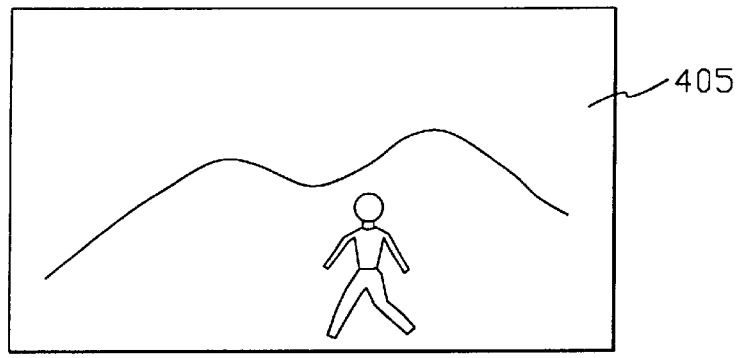
FIGS. 4A to 4C illustrate exemplary digital OSD's.

As described in FIG. 1, the composite video signal includes a synchronization signal, an analog video signal, and analog OSD data carried via the selected channel. The composite video signal processing circuit 108 operates the same way as described with respect to FIG. 1 and generates a video image signal corresponding to the video image, e.g., 405 shown FIG. 4A. Then, the generated video image signal is transmitted to the terminal "0" of the switch 117 and the synchronization signal separator 201, which serves to generate an analog synchronization signal from the video image signal. Meanwhile, the analog OSD data extracted by the first detector 103 is provided to the A/D convertor 230 via a line L19 and converted to digital OSD data. The converted digital OSD data is then stored by the microprocessor 105 in the RAM 106 via a line L17.

Figure 3A:
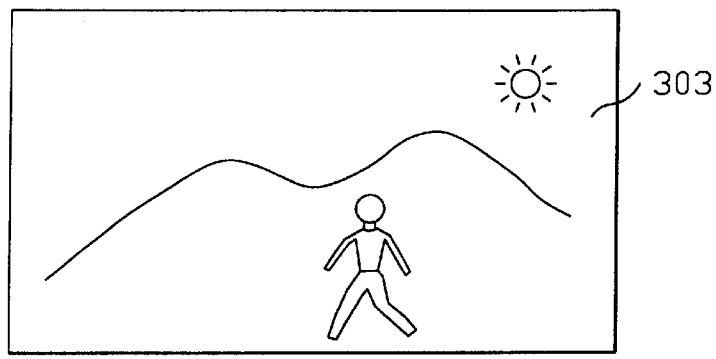
FIGS. 3A to 3C depict typical analog OSD's.
Figure 3B:
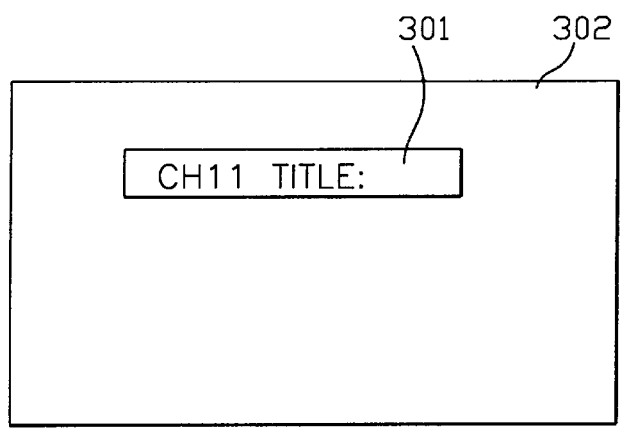
Figure 3C:
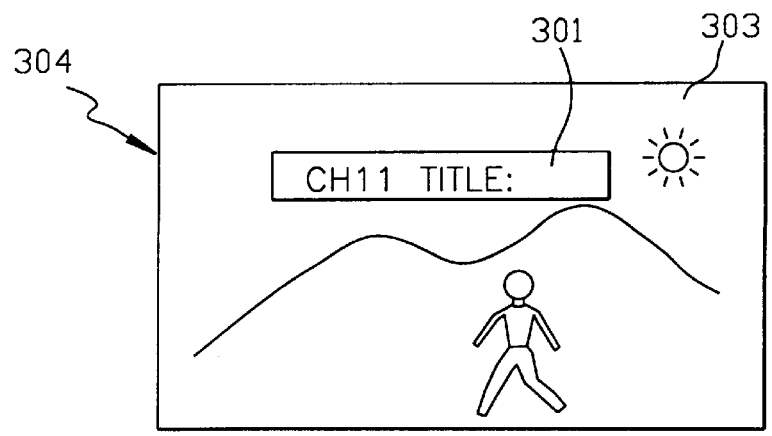
Figure 4B:
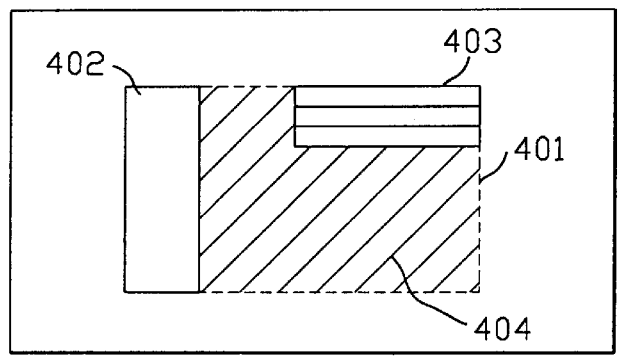

When the viewer requests to generate an OSD on a screen(not shown) in order to control the STB or to view information, e.g., teletext or viewdata, or the like, carried by the selected analog channel, an OSD data is retrieved by the microprocessor 105 from the RAM 106 via the line L17 and provided to the OSD generator 112 through the line L13. Responding to the OSD data signal, the OSD generator 112 generates, e.g., the OSD 401 shown in FIG. 4B. The OSD data signal includes OSD data to be displayed on the screen and position information thereof within the screen; and can be either generated from the microprocessor 105 or provided via the selected analog channel. The OSD generated from the OSD generator 112 can be either a normal or a combined OSD, e.g., shown in FIGS. 3B and 4B. Thereafter, the OSD generator 112 provides an OSD signal to the OSD buffer 111. The OSD signal includes data for all the pixels within the screen and position information of the OSD, wherein each pixel in the generated OSD signal is represented by N-bits of binary numbers, e.g., Y of 6-bits, $C_r$ of 4-bits, and $C_b$ of 4-bits as described above. In the preferred embodiment of the invention, N-bits for each of the pixels corresponding to a surplus OSD, e.g., 404 shown in FIG. 4B, are all "1" bits and each pixel included in the remaining part of the OSD, i.e., the actual OSD's 402 and 403 carrying OSD data to be displayed, is expressed by N-bits having one or more "0" bits. Further, each pixel residing outside the OSD 301 or 401 is also expressed by N-bits of binary numbers having therein one or more "0" bits. The position information included in the OSD signal represents position data for the OSD's 402–404 in case the OSD generated by the OSD generator 112 corresponds to the combined OSD 401 and position data for, e.g., the OSD 301 if the OSD generated by the OSD generator 112 corresponds to the normal OSD.

The OSD buffer 111 stores therein the generated OSD signal and transmits same to the mixing circuit 114 and the pixel data included in the OSD signal to the AND gate 204.

Figure 4C:
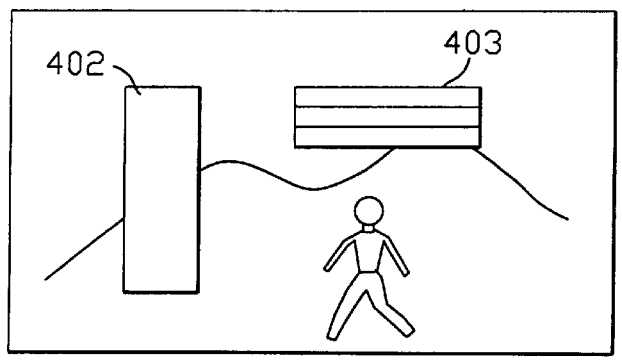

The mixing circuit 114 receives the generated OSD signal and a digital padding signal fed from the switch 202, wherein the black level signal is generated by a padding signal generator(not shown). Thereafter, the mixing circuit 114 mixes the pixel data from the OSD buffer 111 with the digital padding signal based on the position information included in the OSD signal. The mixing circuit 114 functions in a similar fashion as in FIG. 1 to thereby generate a mixed OSD signal representing a video image, similar to the one, e.g., shown in FIG. 4C excepting that all the pixels residing outside the actual OSD's 402 and 403 are represented by the digital padding signal of, e.g., a black level having all "0" bits in lieu of decoded pixel values from the video decoder 113. The mixing circuit 114 transmits the mixed OSD signal to the NTSC/PAL encoder 116 via a line L25. Also, the mixing circuit 114 transmits an OSD indication signal to the second AND gate 206 through a line L26. The OSD indication signal represents whether a pixel is included in the combined OSD, wherein the OSD indication signal has a first logic level, e.g., 0, if a pixel is outside the combined OSD and a second logic level, e.g., 1, if otherwise.

In response to the analog synchronization signal, the NTSC/PAL encoder 116 converts the mixed OSD signal into the standard NTSC/PAL analog signal based on the synchronization signal from the switch 203, in a similar manner as in FIG. 1 and then transmits the converted OSD signal to a terminal "1" of the switch 117.

Meanwhile, it is determined at the transparency indicator 40 whether a pixel included in the converted OSD signal belongs to an actual OSD or not. The transparency indicator 40 issues the control signal CS3 of the second logic level, i.e., 1, if a pixel is determined to be one of the pixels constituting an actual OSD, and the control signal CS3 of the first logic level, i.e., 0, if otherwise. Specifically, each pixel positioning outside the surplus OSD has at least one "0" bit and each pixel corresponding to the surplus OSD is represented by N-bits of "1" as described above. As a consequence, the output signal processed by the first AND gate 204 and the inverter 205 is the logic "0" for each pixel belonging to the surplus OSD and the logic "1" for each pixel residing outside the surplus OSD.

The second AND gate 206 receives the inverter output and the OSD indication signal from the mixing circuit 108. As described above, the OSD indication signal is set to the logic "0" for the pixels outside the combined OSD and the logic "1" for the pixels belonging to the combined OSD. The resultant output signal from the second AND gate 206 to the OR gate 207 is the logic "1" for each pixel belong to an actual OSD and the logic "0" for each pixel not included in an actual OSD. The OR gate 207 also receives the control signal CS1, which is set to the logic "0" when an analog channel is selected. As a result, the control signal CS3 outputted from the transparency indicator 40 is determined as the logic "1" for each pixel residing inside an actual OSD and the logic "0" for each pixel not belonging to an actual OSD.

At the switch 117, the video image signal from the composite video signal processing circuit 108 and the converted OSD signal from the NTSC/PAL encoder 116 are selectively chosen on a pixel basis depending on the control signal CS3. That is, the switch 117 outputs the video image signal on the terminal "0" thereof if the control signal CS3 is the logic "0" and the converted OSD signal on the terminal "1" if otherwise, resulting in a video output, e.g., shown in FIG. 4C. The video output signal is transmitted to a display unit (not shown) and processed therein for the display thereof. It should be apparent to the one skilled in the art that in case an OSD is of the form shown in FIG. 3B having no surplus OSD therein, the OSD can be regarded as a combined OSD having actual OSD's only and can be processed in a similar manner as described above.

As can be seen from the foregoing descriptions, in accordance with the present invention, while the analog broadcast signal is being displayed on the screen, the viewer can use an improved GUI processed by the digital signal processing module 30 shown in FIG. 2.

When the viewer selects a satellite channel, a satellite video signal transmitted via the selected satellite channel and demodulated at the digital broadcast signal demodulator 102(not shown), is applied to the video decoder 113 and the control signal CS1 is set to "1" as in FIG. 1, causing an output signal from the video decoder 113 and the 27 MHz SYNC to be selected by the switches 202 and 203. Consequently, the OSD buffer 111, the OSD generator 112, the MPEG block 115 and the NTSC/PAL encoder 116 function in identical manners as in the digital signal processing module 20 shown in FIG. 1. Further, the control signal CS3 is set to "1" regardless of the output from the AND gate 206 because the control signal CS1 inputted to the OR gate 207 is set to "1", enabling the output signal from the NTSC/PAL encoder 116 to be selected as the video output at the switch 117.

While the present invention has been shown and described with reference to those skilled in the art that many changes and modifications may be without departing from the spirit and scope of the invention as defined in the appended claims.

What is claimed is:

1. A method, for use in a video equipment, for providing a mixed video image signal, wherein the video equipment has means for selecting an analog broadcast signal, comprising the steps of:
   a) generating an analog video signal from the selected analog broadcast signal;
   b) providing a digital on-screen display(OSD) signal including a combined OSD signal representing a combined OSD, wherein the combined OSD signal has therein an actual OSD signal representing one or more OSD's to be displayed on a screen;
   c) producing a digital padding signal;
   d) replacing a portion of the digital padding signal with the actual OSD signal to thereby provide a mixed digital OSD signal;
   e) converting the mixed digital OSD signal into an analog OSD signal; and
   f) substituting a part of the analog video signal with a fraction of the analog OSD signal corresponding to the actual OSD signal to thereby provide the mixed video image signal.

2. The method according to claim 1, wherein the combined OSD signal further includes a surplus OSD signal not to be displayed on the screen.

3. The method according to claim 2, wherein each pixel of the combined OSD signal is represented by N-bits of binary numbers.

4. The method according to claim 3, wherein each pixel corresponding to the surplus OSD signal is represented by N-bits of a first binary number and each pixel corresponding to the actual OSD signal includes one or more second binary numbers.

5. The method according to claim 4, wherein each pixel of the digital padding signal is represented by the second binary number.

6. The method according to claim 5, wherein the first and the second binary numbers are "1" and "0", respectively.

7. The method according to claim 6, wherein the step f) includes the steps of:

f1) generating a determination signal representing whether each pixel in the mixed digital OSD signal belongs to the actual OSD signal; and f2) substituting the part of the analog video signal with the fraction of the analog OSD signal based on the determination signal.

8. The method according to claim 7, wherein the step d) includes the step of generating a first indication signal representing whether each pixel of the mixed digital OSD signal belongs to the combined OSD signal.

9. The method according to claim 8, wherein the step f1) has the steps of:

f11) providing a second indication signal indicating whether each pixel of the digital OSD signal belongs to the actual OSD signal; and f12) generating the determination signal based on the first and the second indication signals.

10. The method according to claim 9, wherein the video equipment is a settop box for receiving terrestrial, cable and satellite broadcast signals.

11. An apparatus for providing a mixed video image signal, comprising:

means for selecting an analog or a digital broadcast signal;

means for producing a digital padding video signal;

means for generating an analog video signal from the selected analog broadcast signal;

means for providing a reconstructed digital video signal from the selected digital broadcast signal;

means for producing, as a digital image signal, the digital padding signal or the reconstructed digital video signal if the analog or the digital broadcast signal is selected;

means for obtaining a digital on-screen display (OSD) signal including a combined OSD signal, wherein the combined OSD signal has therein an actual OSD signal representing one or more OSD's to be displayed on a screen;

means for replacing a portion of the digital image signal with the actual OSD signal to thereby provide a mixed digital image signal;

means for converting the mixed digital image signal into a mixed analog image signal;

a logic means for generating a first control signal if the digital broadcast signal is selected and if the analog broadcast signal is selected, determining whether each pixel included in the mixed digital image signal belongs to the actual OSD signal to thereby generate the first control signal if each pixel belongs to the actual OSD signal, and a second control signal if otherwise; and means for selecting, on a pixel-by-pixel basis, the mixed analog image signal and the analog video signal in response to the first and the second control signals, respectively, to thereby provide the mixed video image signal.

12. The apparatus according to claim 11, wherein the replacing means includes means for generating a first indication signal representing whether each pixel of the mixed digital image signal belongs to the combined OSD signal.

13. The apparatus according to claim 12, wherein the logic means includes:

means for providing a second indication signal indicating whether each pixel of the digital OSD signal belongs to the actual OSD signal; and means for providing the first and the second control signals based on the first and the second indication signals if the analog broadcast signal is selected, and generating the first control signal irrespective of the first and the second indication signals if the digital broadcast signal is selected.

14. The apparatus according to claim 13, wherein the means for providing the first and the second control signals has means for generating the second control signal if and only if the analog broadcast signal is selected and a pixel is determined as being located outside the one or more OSD's.

15. The apparatus according to claim 14, wherein each pixel of the combined OSD signal is represented by N-bits of binary numbers.

16. The apparatus according to claim 15, wherein the combined OSD signal further includes a surplus OSD signal not to be displayed on the screen and each pixel corresponding to the surplus OSD signal is represented by N-bits of a first binary number.

17. The apparatus according to claim 16, wherein each pixel corresponding to the actual OSD signal includes one or more second binary numbers.

18. The apparatus according to claim 17, wherein the first and the second binary numbers are "1" and "0", respectively.

19. The apparatus according to claim 18, wherein the apparatus is a settop box for receiving terrestrial, cable and satellite broadcast signals.

* * * * *